Patented Mar. 24, 1931

1,797,780

UNITED STATES PATENT OFFICE

FÉLIX JOSEPH MALHERBE, OF BRUSSELS, BELGIUM

PROCESS OF AND MIXTURE FOR INCREASING THE DURABILITY OF LININGS OF FURNACES OR OVENS AND THE LIKE

No Drawing. Application filed July 20, 1928, Serial No. 294,313, and in Belgium July 29, 1927.

My present invention relates to a new process of increasing the durability of the soles of flatting furnaces, the so-called flatting plates on which the glass sheets or plates or special glasses are flattened by reheating.

It has already been suggested to polish such flatting plates or stones by means of soluble glass or silicate of soda by the admixture of certain bodies which when used according to the usual polishing process enable the stones to be polished upon repeated treatments. In this process the flatting stone will be coated with a thin hard film of soluble glass which however will subsequently be sealed by the action of heat and stick to the glass.

The object of my invention is to considerably increase the life of the flatting stones and this result will be obtained by impregnating the stones either with silicate of potash or silicate of soda or a mixture of both substances in such a way that the silicate will pass through the full thickness of the stones and be dried within the same, whilst the top faces of the stones will remain free from silicate, whereby I obtain flatting stones the upper inner parts of which will be hardened whilst the top faces thereof will remain free from silicate.

In order to enable the stones to be impregnated as described, the sodium silicate, potassium silicate or a mixture thereof will be emulsioned, according to this invention, in another liquid, for instance petroleum, and the upper parts of the stones will be dipped into this mixture. Preferably the top faces of the stones after being wiped off, will not be polished.

By way of example I may mix 90 kilogs. of silicate or silicates, with 15 kilogs. of petroleum, but these proportions may vary between wide limits.

Having now fully described my said invention, what I claim and desire to secure by Letters Patent, is:

A process of increasing the life of fireproof materials, particularly those from which the soles of flatting furnaces for reheating glass sheets or plates or any other fireproof linings are made, which consists in impregnating such fireproof parts with a mixture of silicate of potash and silicate of soda in petroleum, substantially as set forth.

In testimony whereof I have hereunto set my hand.

FÉLIX JOSEPH MALHERBE.